May 3, 1960 D. W. MOLINS ET AL 2,935,069
MANUFACTURE OF COMPOSITE MOUTHPIECE CIGARETTES
Filed June 12, 1958 4 Sheets-Sheet 1
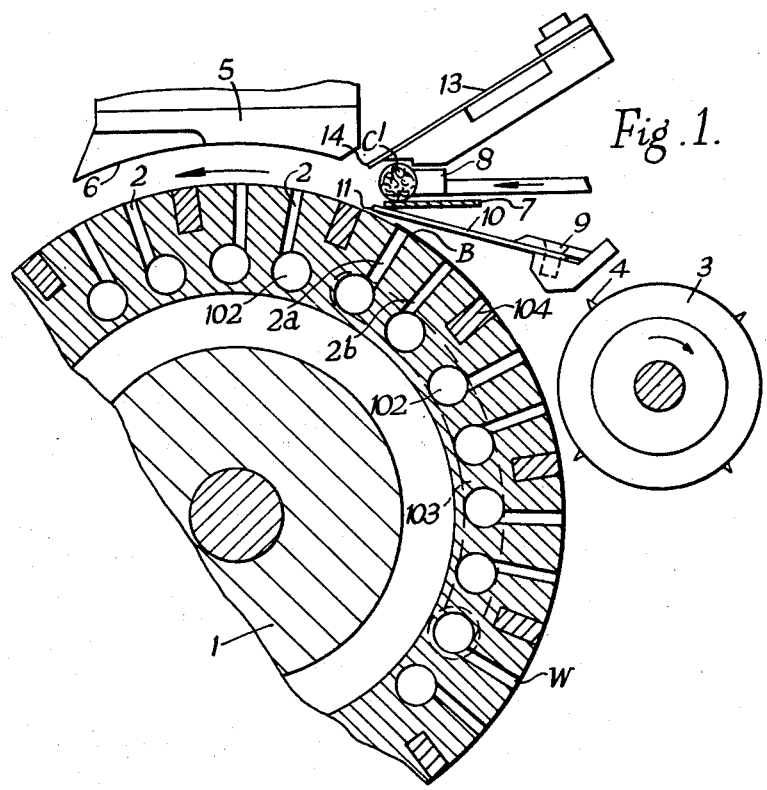
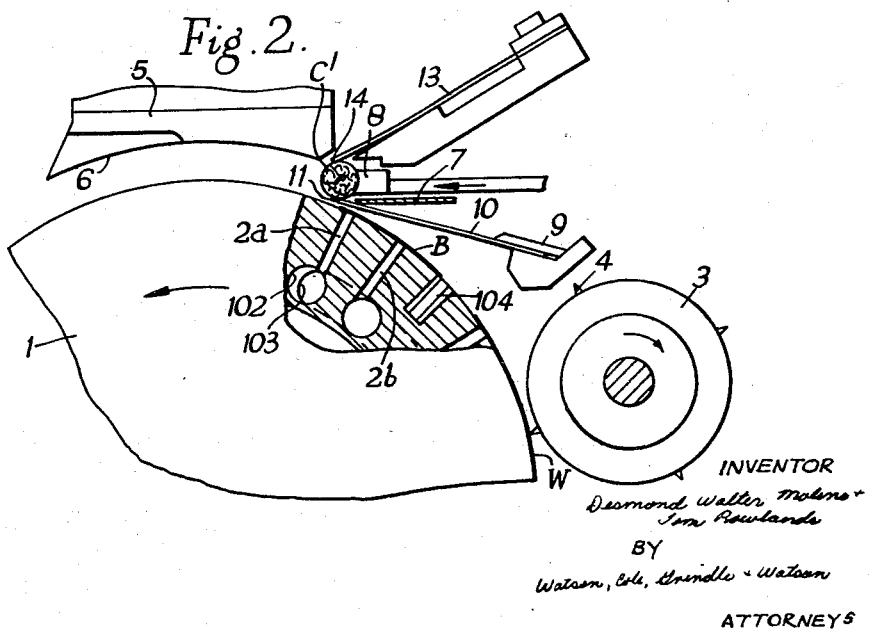
INVENTOR
Desmond Walter Molins +
Tom Rowlands
BY
Watson, Cole, Grindle & Watson
ATTORNEYS

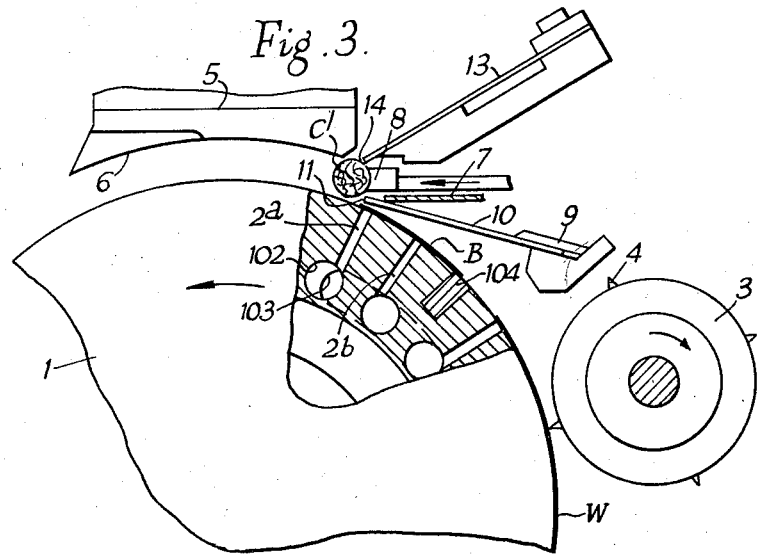
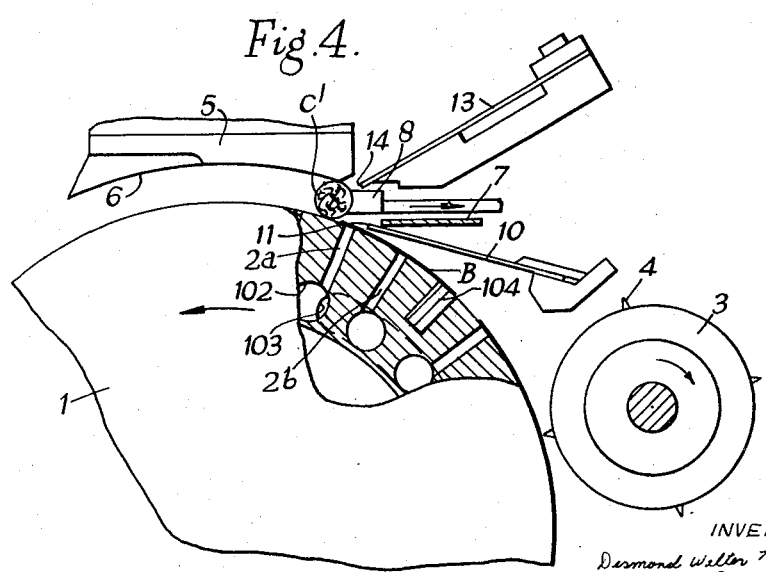

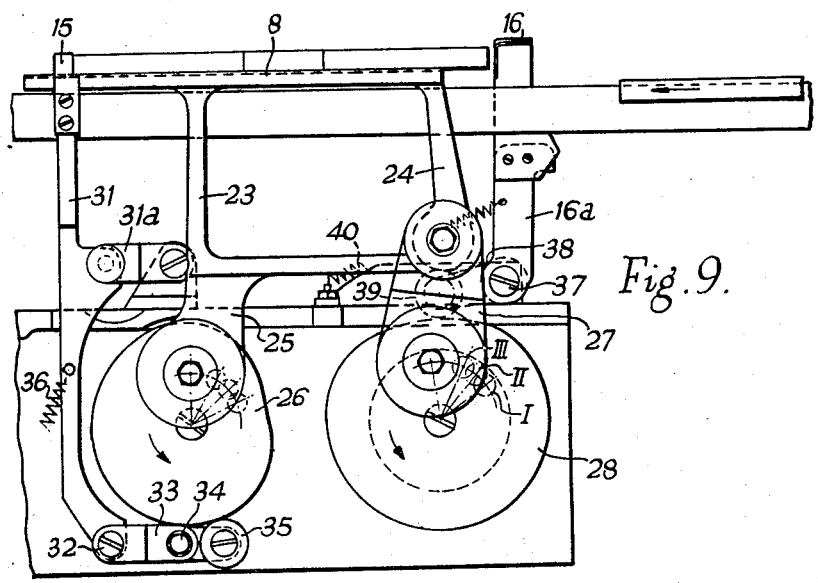
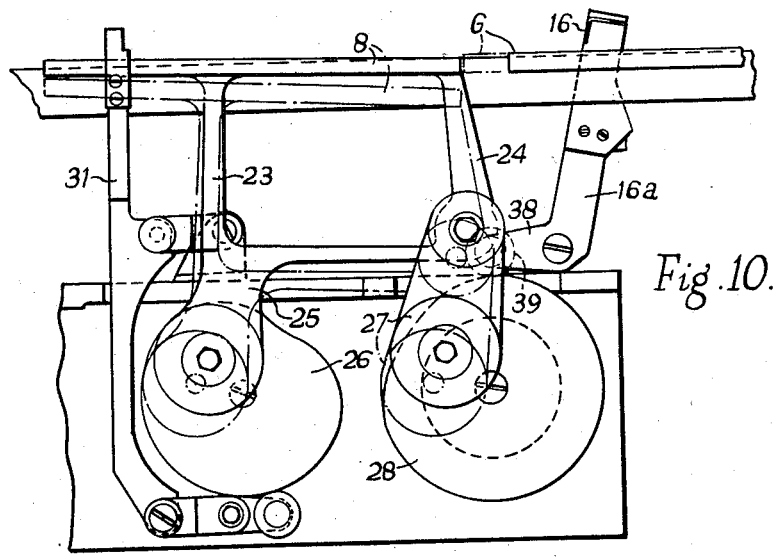

United States Patent Office 2,935,069
Patented May 3, 1960

2,935,069

MANUFACTURE OF COMPOSITE MOUTHPIECE CIGARETTES

Desmond Walter Molins and Tom Rowlands, London, England, assignors to Molins Machine Company Limited, London, England, a British company Application June 12, 1958, Serial No. 741,572

Claims priority, application Great Britain June 20, 1957

8 Claims. (Cl. 131—94)

This invention concerns improvements in or relating to the manufacture of composite mouthpiece cigarettes each of which comprises a cigarette length and a mouthpiece portion arranged end to end and united by an encircling uniting band. A mouthpiece portion may consist of a length or group of lengths of filtering material, or one or more hollow tubes, or a length or group of lengths of any other material suitable for forming the mouthpiece portion of a cigarette, or any combination of the foregoing. For convenience such mouthpiece portions will be referred to as "stubs." The expression "double-length stub" where used herein means a stub double the length required for an individual mouthpiece cigarette.

For the satisfactory production of such mouthpiece cigarettes it is desirable to ensure that the parts to be united are arranged in close endwise abutment and also in accurate axial alignment before the uniting band is wrapped around them.

According to the present invention there is provided in the manufacture of composite mouthpiece cigarettes, a method of feeding groups each consisting of a stub and at least one cigarette length (e.g. consisting of a double-length stub lying between two cigarette lengths) which method comprises pushing a group sideways between opposed surfaces which offer frictional resistance to the sideways movement of the group, so as to align the parts axially, releasing the axially aligned group from said surfaces and applying endwise pressure to bring the parts into close endwise abutment while the said parts are relatively free to move endwise, releasing the group from said endwise pressure and thereafter gripping the aligned, abutted group so as to maintain the arrangement of its parts while a uniting band is applied thereto.

Further according to the invention there is provided, in the manufacture of mouthpiece cigarettes, a method of arranging groups, each consisting of at least one cigarette length and a stub (e.g. consisting of a double-length stub lying between two cigarette lengths), in axial alignment and endwise abutment, which method comprises the steps of axially aligning the parts of a group while the end surfaces of the said parts are sufficiently free from one another to permit the said parts to move relatively to each other, and then applying endwise pressure to the group such as to bring the said end surfaces into close abutting contact.

Still further according to the invention there is provided, in apparatus for making composite mouthpiece cigarettes, a pusher to push sideways a group consisting of a stub and at least one cigarette length (e.g. a double-length stub lying between two cigarette lengths) arranged end to end, a pair of opposed surfaces arranged to engage the said group laterally and frictionally oppose its sideways movement and thereby align the parts of said group axially, means operable after the group has been released from the grip of the said opposed surfaces, to apply momentarily endwise pressure to the group from opposite ends thereof, so as to cause close endwise abutment between the parts of the group, and means operable after said endwise pressure is removed, to grip the abutted group laterally so as to maintain its arrangement while a uniting band is applied to it.

The said opposed surfaces may be formed by a support surface across which the group is pushed, and a yielding (e.g. resilient) element arranged above said support surface at a distance such that it presses laterally against a group which is being pushed beneath and past it by the said pusher.

The means to apply endwise pressure may comprise a pair of opposed presser members so located as to register endwise with a group which has just moved past the said yielding element, one of said presser members being arranged to move towards the other so as to press against the end of the group (e.g. against the exposed end surface of a cigarette length). One of the said presser members may be arranged to move with a group in the direction of sideways movement of the group.

The pusher may be arranged to push the group sideways into the grip of a further pair of opposed surfaces which grip the aligned, abutted group laterally. For example one of the said further opposed surfaces may be arranged to move relatively to the other so as to impart a rolling action to the group, whereby the group is rolled over a uniting band which is coated with adhesive.

Further according to the invention there is provided in apparatus for making mouthpiece cigarettes, means to form a group consisting of a stub and at least one cigarette length (e.g. a double-length stub between two cigarette lengths), control means to hold the component parts of a group against movement relatively to one another while a uniting band is being wrapped around them, a pusher to push the said group laterally into the control of said control means, an element arranged to engage the group and press it against the pusher while the latter is pushing the group towards said control means, and thereby align the said component parts axially, said element being spaced from the said control means whereby the group after being pushed past the said element is free from lateral control until it comes under control by the said control means, and means to apply endwise pressure to the group to abut its component parts while the group is passing from the said element to the said control means.

Apparatus in accordance with the invention will now be described by way of example with reference to the accompanying drawings, in which:

Figures 1 to 4 are end views, partly in section, illustrating successive stages in the sideways movement of a group consisting of two cigarette lengths and a stub;

Figures 9 and 10 are plan views showing mechanism for operating the pusher and presser members shown in Figures 5 to 8.

Figure 5:
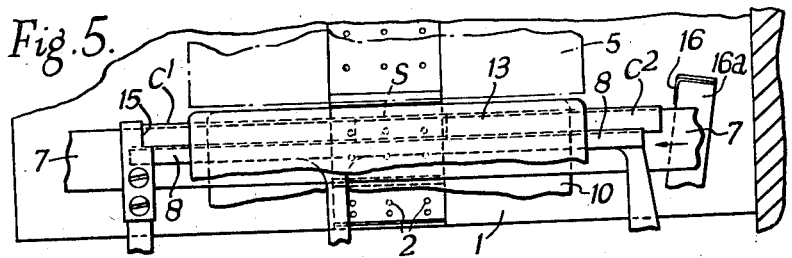
Figures 5 to 8 are plan views corresponding to Figures 1 to 4, and showing means for causing endwise abutment of the group.

The apparatus shown in the drawings forms part of a machine for making composite mouthpiece cigarettes. This machine is of a character generally similar to that of the machine disclosed in the complete specification and drawings of United States application Serial No. 671,607 in that it comprises means to form endwise-moving groups each consisting of a double-length stub lying between two cigarette lengths, and pusher means to push successive groups sideways so as to deliver them to uniting means. The uniting means comprises a suction drum which feeds spaced portions of adhesive-coated tipping material for application to successive groups, and a fixed surface opposed to the drum surface whereby the groups, which are pushed between the said surface and the drum, are caused to roll over the portions of tipping material, which constitute uniting bands.

The accompanying drawings show a part of a rotating suction drum 1 with suction ports 2 in its periphery, communicating by means of conduits 102 with a suction chamber 103 held in a fixed position within the drum.

A continuous web of adhesive-coated tipping material W is fed to the drum 1 at a controlled speed which is slower than the peripheral speed of the drum, which therefore slips beneath the web. A rotating cutter-roller 3 is provided with knives 4 which cut the web at intervals against hardened insets 104. Due to the greater speed of the drum, each portion cut from the web is carried away from the uncut web by the drum and thus spaced from the web. Each such portion is to form a uniting band, such as the band B, Figures 1–4.

Above the drum 1 is a plate 5 with a concave surface 6 opposed to the periphery of the drum. The surface 6 cooperates with the drum to cause groups of cigarette lengths and stubs to roll over uniting bands, each such group consisting of a double-length stub lying between the ends of two cigarette lengths, and each uniting band being so positioned on the drum, and of such a size, as to be able to encircle the double-length stub and in addition a short length of each cigarette length adjacent the stub.

The suction ports 2 are arranged in parallel rows of three each, see Figures 5 to 8, and as shown in Figure 1 there are two rows of ports between every two insets 104. The controlled speed of the web W is so related to the peripheral speed of the drum 1 that at the moment when the web is cut against an inset 104, the portion cut off lies over two rows of ports 2. This is illustrated in Figure 1, where a severed portion constituting a uniting band B is shown with its leading edge just in advance of the leading row of two adjacent rows of ports $2a$ and $2b$, while its rear edge is of course on an inset 104. Accordingly the band B in Figure 1 is suctionally held to the drum by two rows of ports.

When a band such as B overtakes a group rolling between the drum 1 and the concave surface 6, it must be released from the drum in order to allow it to wrap itself around the group. If the whole band were to be released from the influence of suction before it has made effective contact with a group, there would be a risk that the band might be displaced on the drum and might therefore not be correctly positioned on the group. For example it might move sideways or become twisted.

Accordingly the fixed suction chamber 103 is arranged and positioned so that suction is cut off from the leading row only of two adjacent rows of ports just before the leading edge of a band located over those two rows of ports makes contact with a group. This is best seen in Figure 4, where the band B is about to contact a group and the conduit $102a$ communicating with the leading row of ports $2a$ is just moving out of communication with the suction chamber 103. It will be seen, however, that the rear part of the band B is still suctionally held by the ports $2b$ since this is still in full communication with the chamber 103. Thus the rear part of the band is held in position on the drum until the leading part has engaged a group and has started to wrap itself around the rolling group. By the time the group has rolled on to that part of the band which lies over the ports $2b$, these ports have been cut off from the suction chamber 103.

The groups may be formed in any convenient way, but in the arrangement shown they are formed by feeding spaced cigarette lengths endwise on a conveyor band 7, inserting a double-length stub into the space behind every second cigarette length so as to form groups, and closing up the gaps between the parts of each group during their axial travel. This may be accomplished in the same or a similar way to that disclosed in the specification referred to above.

It is to be understood that a double-length stub which is inserted between two cigarette lengths may, when so inserted, be in the form of an undivided or coherent length, or may be in the form of a number of separate parts which may be fed into position either collectively or separately.

Each successive group is then engaged by a pusher 8 which pushes the group towards the uniting means, that is, towards the drum 1 and plate 5.

Beneath the pusher 8 is a bracket 9 on which is secured a thin but rigid metal plate 10 having a front edge 11. A further bracket 12 is fixed above the pusher and has clamped on it a thin, flexible and resilient plate 13 having a front edge 14. The plate 13 is free to flex upwardly on pressure from below at the region of its front edge. The edges 11 and 14 are spaced from each other by a distance a little less than the diameter of a group which is to be united, and as can be seen from Figure 2, if a group is pushed between the edges 11 and 14 by the pusher 8, the flexible plate 13 is pushed upwardly by the group.

Figure 6:
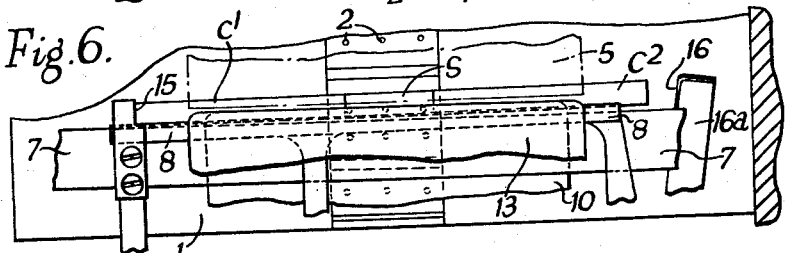
Figure 7:
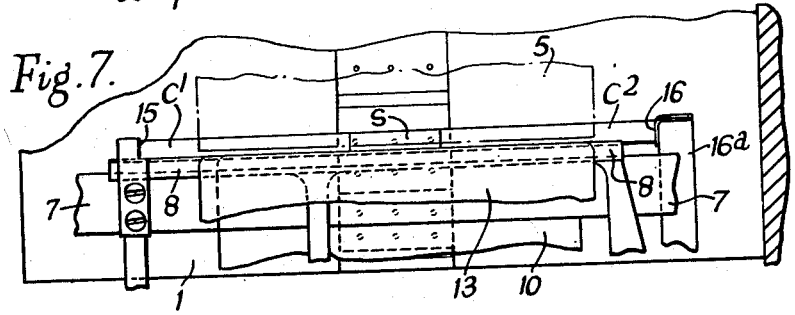

In Figures 5–8 are illustrated two presser members 15 and 16 which have the function of pressing against opposite ends of a group in order to cause close endwise abutments between the stub and cigarette lengths forming the group. These members 15 and 16 are operated by mechanism shown in Figures 9 and 10. The presser 15 is arranged to move forwardly with the pusher 8 during a pushing stroke of the latter, whereas the member 16 extends upwardly from an arm $16a$ which simply swings to and fro at desired times. The pusher 8 is mounted on rotating crank discs (see Figures 9 and 10) in a manner which will be more fully described later, and during its forward pushing stroke has a component of movement towards the left as viewed in Figures 5 to 8. The presser member 15 has a corresponding but smaller movement in the same direction. This can be seen by comparing the successive positions of the pusher 8 and presser member 15 in Figures 5 to 8. At the extreme forward position of the pusher 8 and of the member 15, the latter is directly opposite the presser member 16, as can be seen in Figure 7.

The operation of the apparatus so far described is as follows.

Successive groups (each consisting of a double-length stub lying between two cigarette lengths) are fed lengthwise by the band 7 in the direction indicated by the arrow, Figure 5. As each group comes into the range of action of the pusher 8, it is engaged by the pusher and moved sideways. At that stage the parts of the group may be more or less loosely abutted—that is, the end faces of the stub may be in physical contact with the adjacent end faces of the two cigarette lengths—but they are not pressed closely or tightly against each other. Accordingly at this stage the cigarette lengths and stub of a group are capable of some lateral movement relatively to one another.

The first engagement of the pusher with a group is illustrated in Figures 1 and 5. It will be seen from Figure 1 that at this instant a group (consisting of two cigarette lengths $C_1$, $C_2$, and a stub S) is supported on the conveyor 7 near one edge of the conveyor, and the undersurface of the bracket 12 above the conveyor is shaped so as to guide the lengthwise moving group in that position. As shown in Figure 5, the presser member 15 is in engagement with the leading end face of the group and the member 16 is clear of the group.

Figures 2 and 6 illustrate a further stage, at which the pusher has pushed the group off the conveyor 7 and between the edges 11 and 14 of the plates 10 and 13, causing the plate 13 to flex a little. As can be seen in Figure 6, the presser member 15 has moved forwardly with the pusher 8 and has also moved a little to the left, although not so far as the pusher. The member 16 is still retracted and clear of the group.

At the stage shown in Figures 3 and 7, the group has been pushed clear of the plates 10 and 13, and is, at the instant depicted, about to fall onto the drum 1, but is momentarily unsupported and laterally unconfined. During the transition to this stage from that shown in Figures 2 and 6, the arm $16a$ has swung over so as to bring the presser member 16 into engagement with the end of the cigarette length $C_2$. This movement is so timed that the presser 16 approaches closest to the presser 15 at the instant when the group is in the laterally unconfined condition illustrated in Figure 3.

Figure 8:
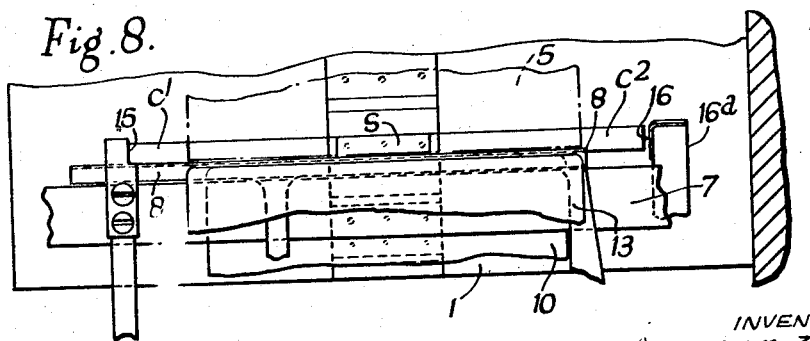

Figures 4 and 8 show the pusher having reached the end of its forward stroke and having just pushed the group between the drum 1 and the plate 5. Prior to this stage the arm 16a has swung back to remove the presser member 16 from engagement with the cigarette length $C_2$, and the group is gripped between the drum 1 and the concave surface 6 of the plate 5, just ahead of a uniting band B. The engagement of the group by the surface 6 causes the group to roll on the drum and to be overtaken by the uniting band which therefore is wrapped about the group.

As has already been stated, when a group is first engaged and pushed sideways by the pusher 8, the component parts of the group are not closely or tightly abutted end to end, and are thus capable of some lateral movement relatively to each other. This makes it possible to bring them into accurate alignment with one another, and this is accomplished by pushing the group against and past the two opposed plates 10 and 13, which frictionally oppose its sideways movement by the pusher and thus press the cigarette lengths and stub against the straight pushing face of the pusher. This is the condition illustrated in Figures 2 and 6.

As soon as the group has been thus aligned and pushed past the edges 11 and 14 of the opposed plates 10 and 13, it is, as shown in Figure 3, momentarily free from any lateral restriction or frictional grip. Accordingly its component parts have, at that instant, the maximum freedom to move axially, and it is at that instant that the presser member 16 approaches closest to the opposing member 15, and presses against the end of the cigarette length $C_2$. Thus the group is, at that instant, firmly gripped and pressed endwise from opposite ends, and its component parts are closely and tightly pressed and abutted against each other end to end. The presser member 16 after engaging the end face of the group immediately retracts leaving the group free prior to its entry between the drum 1 and the plate 5.

It is important that the group should be free of any pressure between the members 15 and 16 at the time that they start rolling between the plate 5 and the drum 1, because it is undesirable that it should have a rolling movement at the same time that the ends are being pressed together. Accordingly to ensure that this cannot occur, the member 16 is so timed that it is free of the end of the cigarette length $C_2$ before rolling commences.

It will be seen that the final axial alignment and final endwise abutting of a group occurs in two distinct stages. First, the parts are axially aligned while their adjacent end faces are sufficiently free from one another not to offer undue resistance to relative lateral movement of the parts. Then when the parts are axially aligned and are momentarily freed from lateral frictional grip, they are pressed together endwise and closely abutted end to end. Immediately after this they are again released, after which they are gripped laterally and rolled over the uniting band, before they have time to lose either their axial alignment or their close endwise abutment.

It will be appreciated that the operations which have been described occur very rapidly, and the distance over which the group moves from the position shown in Figure 3 where it is released from sideways control, to the position where it is engaged once more between two opposed surfaces, is very short, so that there is insufficient time for the parts, while moving from the position in Figure 3 to the position in Figure 4, to lose their axial alignment. During this short movement the group is given a sudden endwise tap by the members 15 and 16, and the member 16 is moved clear of the group before the latter can reach the position where it is engaged by the plate 5 and the drum 1. Thus the parts are uncontrolled momentarily, but the time during which they are uncontrolled is too short for them to become materially displaced.

The mounting and operation of the pusher 8 and the presser members 15 and 16 is similar to that described in the complete specification and Figures 5 and 6 of the drawings of United States application Serial No. 671,607 and will now be briefly described with reference to Figures 9 and 10 of the accompanying drawings.

The pusher 8 is carried by arms 23 and 24. An extension 25 of the arm 23 is pivoted on a crank disc 26 which is formed as a cam. The arm 24 is connected by a link 27 to a further crank disc 28 which is also formed as a cam.

The distance between the point at which the link 27 is pivoted on the disc 28, and the centre of rotation of the disc 28, is 3.5 mm. greater than is the distance between the point at which the extension 25 is pivoted on the disc 26, and the centre of rotation of the disc 26. Further, the pivot centre of the link 27 on the disc 28 is 6° in advance of that of the extension 25 on the disc 26, considered in the direction in which the discs rotate, as indicated by arrows in Figure 9.

The presser member 15 is mounted on an arm 31 which is pivoted at 32 to one end of a lever 33 which in turn is pivoted about a fixed pivot at 34. The other end of the lever 33 carries a roller 35 which rides on the edge of the cam 26, being urged against the cam by a spring 36. The arm 31 is also connected by a link 31a to a fixed pivot.

The arm 16a which carries the presser member 16 is pivoted at 37 and has an extension 38 carrying a roller 39 which is urged against the edge of the cam 28 by a spring 40.

Referring now to the mounting of the pusher, as explained in the specification referred to above, the pusher is not given an entirely parallel movement, but will at most times be tilted with respect to the tape 7. The purpose of this arrangement is to enable the right-hand end of the pusher (as viewed in Figures 5 to 10) to make a quicker withdrawal after a pushing stroke and so avoid fouling the oncoming group which is being moved endwise by the conveyor 7 into position to be engaged by the pusher on its next pushing stroke. This is illustrated in Figure 10, where the retracting pusher is shown in one position shown in full line, and a later position shown in dot-and-dash line, these two positions corresponding respectively to the full line and the dot-and-dash line positions of the oncoming group marked G, Figure 10.

Referring to Figure 9, the pusher and associated parts are shown in the position they occupy at the stage illustrated in Figures 4 and 8, that is, with the pusher at the end of its pushing stroke. It will be seen that at this stage the pushing surface of the pusher 8 is parallel with the tape 7 and with the edges 11 and 14 of the plates 10 and 13.

Figure 9 also shows, by dot-and-dash line circles marked on the disc 28, successive positions I, II and III of the pivot centre of the link 27, which positions correspond to the positions occupied by the pusher in Figures 1, and 4, 2 and 6, and 3 and 7, respectively.

It has already been stated that the pusher face is parallel to the tape 7 at the very end of its pushing stroke, that is at the stage shown in Figures 4 and 8. It is also parallel to the tape at the stage illustrated in Figures 1 and 5, that is, at the moment when it first engages a group. In the stages shown in Figures 2 and 6 and Figures 3 and 7, however, as a result of the way in which the pusher is mounted in order to tilt it as it withdraws, it is not quite parallel. The inclination of the pusher from the parallel at these two stages is shown in Figures 6 and 7, but this inclination is very slight, and the angle of deviation of the pusher from parallelism with the tape 7 does not, in Figure 6 and 7, exceed 1°. Accordingly the inclination of the pusher during the time it is pushing a group sideways is so small as to be negligible, and the pusher can for all practical purposes be considered to have a parallel movement while pushing a group sideways.

What we claim as our invention and desire to secure by Letters Patent is:

1. In the manufacture of composite mouthpiece cigarettes, a method of feeding groups, each consisting of a stub and at least one cigarette length (e.g. consisting of a double-length stub lying between two cigarette lengths) which method comprises pushing a group sideways between opposed surfaces which engage cylindrical surfaces only of the group and offer frictional resistance to the sideways movement of the group, so as to align the parts axially while the said parts are free to move relatively to each other transversely of their axes, releasing the axially aligned group from said surfaces and applying endwise pressure to bring the parts into close endwise abutment while the said parts are relatively free to move endwise relatively to each other, releasing the group from said endwise pressure and immediately thereafter gripping the aligned, abutted group so as to maintain the arrangement of its parts while a uniting band is applied thereto.

2. In apparatus for making composite mouthpiece cigarettes, a pusher to push sideways a group consisting of a stub and at least one cigarette length (e.g. a double-length stub lying between two cigarette lengths) arranged end to end, a pair of opposed surfaces arranged to engage cylindrical surfaces only of the said group laterally and frictionally oppose its sideways movement and thereby align the parts of said group axially against the pusher while the said parts are free to move relatively to each other transversely of their axes, means operable after the group has been released from the grip of the said opposed surfaces, to apply momentarily endwise pressure to the group from opposite ends thereof, so as to cause close endwise abutment between the parts of the group, and means operable after said endwise pressure is removed to grip the abutted group laterally by engagement of cylindrical surfaces of the group so as to maintain its arrangement while a uniting band is applied to it.

3. Apparatus as claimed in claim 2, wherein the said opposed surfaces are formed by a support surface across which the group is pushed, and a yielding (e.g. resilient) element arranged above said support surface at a distance such that it presses laterally against a group which is being pushed beneath and past it by the said pusher.

4. Apparatus as claimed in claim 2, wherein the means to apply endwise pressure comprises a pair of opposed presser members so located as to register endwise with a group which has just moved past the said yielding element, one of said presser members being arranged to move towards the other so as to press against the end of the group (e.g. against the exposed end surface of a cigarette length).

5. Apparatus as claimed in claim 4, wherein one of the said presser members is arranged to move with a group in the direction of sideways movement of the group.

6. Apparatus as claimed in claim 2, wherein the pusher is arranged to push the group sideways into the grip of a further pair of opposed surfaces which grip the aligned, abutted group laterally.

7. Apparatus as claimed in claim 6, wherein one of the said further opposed surfaces is arranged to move relatively to the other so as to impact a rolling action to the group, whereby the group is rolled over a uniting band which is coated with adhesive.

8. In apparatus for making mouthpiece cigarettes, means to form a group consisting of a stub and at least one cigarette length (e.g. a double-length stub between two cigarette lengths), control means to hold the component parts of a group against movement relatively to one another while a uniting band is being wrapped around them, a pusher to push the said group laterally into the control of said control means, an element arranged to engage the group and press it against the pusher while the latter is pushing the group towards said control means, and thereby align the said component parts axially, said element being spaced from the said control means whereby the group after being pushed past the said element is free from lateral control until it comes under control by the said control means, and means to apply endwise pressure to the group to abut its component parts while the group is passing from the said element to the said control means.

References Cited in the file of this patent
UNITED STATES PATENTS

| | | |
|---|---|---|
| 121,298 | Scholfield | Nov. 28, 1871 |
| 2,109,617 | Gwinn et al. | Mar. 1, 1938 |
| 2,821,200 | Korber | Jan. 28, 1958 |
| 2,821,201 | Brunswig | Jan. 28, 1958 |
| 2,830,595 | Korber | Apr. 15, 1958 |
| 2,858,046 | Pollman | Oct. 28, 1958 |
| 2,864,379 | Korber | Dec. 16, 1958 |

OTHER REFERENCES

Germany, K 18,943 III/79b, May 24, 1956.